United States Patent [19]

Felegi, Jr. et al.

[11] Patent Number: 5,134,179

[45] Date of Patent: * Jul. 28, 1992

[54] COMPOSITE FIBERBOARD AND PROCESS OF MANUFACTURE

[75] Inventors: John Felegi, Jr.; Kenneth P. Kehrer, both of Lancaster; Edward E. Wise, Jr., Centerville, all of Pa.

[73] Assignee: Armstrong World Industries, Inc., Lancaster, Pa.

[*] Notice: The portion of the term of this patent subsequent to Oct. 16, 2007 has been disclaimed.

[21] Appl. No.: 590,772

[22] Filed: Oct. 1, 1990

Related U.S. Application Data

[63] Continuation-in-part of Ser. No. 434,041, Nov. 15, 1989, Pat. No. 4,963,603, which is a continuation-in-part of Ser. No. 356,217, May 24, 1989, abandoned, which is a continuation-in-part of Ser. No. 275,914, Nov. 25, 1988.

[51] Int. Cl.⁵ .................. C08L 89/00; C08K 3/34; C08K 3/40; D21F 11/00
[52] U.S. Cl. ......................... 524/13; 524/35; 524/401; 524/425; 524/437; 524/438; 524/443; 524/445; 524/492; 524/493; 524/494; 524/497; 162/145; 162/146; 162/147; 162/152
[58] Field of Search ............ 524/13, 35, 443, 445, 524/494, 401, 425, 437, 438, 492, 493, 497; 162/145, 146, 147, 152

[56] References Cited

U.S. PATENT DOCUMENTS

| | | | |
|---|---|---|---|
| 3,344,107 | 9/1967 | Miller | 523/200 |
| 3,418,268 | 12/1968 | Hedrick et al. | 524/790 |
| 4,963,603 | 10/1990 | Felegi, Jr. et al. | 524/13 |

OTHER PUBLICATIONS

Stepek et al., Additives for Plastics, Springer-Verlag, New York, 1983, pp. 70-84.

*Primary Examiner*—Nathan M. Nutter

[57] ABSTRACT

A novel composite board of mineral wool, perlite, and cellulosic newsprint fibers for use primarily as a ceiling tile is disclosed. The board displays virtually no sag (less than 200 mils) when exposed to high temperature and high humidity while displaying quite acceptable strength. The board is manufactured by selective deposition of a composition of latex and extender particles on the cellulosic newsprint fibers.

7 Claims, 2 Drawing Sheets

FLOW DIAGRAM

COMPOSITE FIBERBOARD AND PROCESS OF MANUFACTURE

CROSS REFERENCE TO RELATED APPLICATION

This application is a continuation-in-part of pending U.S. Pat. application Ser. No. 434,041 filed Nov. 15, 1989, and now U.S. Pat. No. 4,963,603, which was a continuation-in-part of U.S application Ser. No. 356,217 filed May 24, 1989, now abandoned, which was a continuation-in-part of pending U.S. Pat. application Ser. No. 275,914 filed Nov. 25, 1988 pending.

This invention relates to a novel composite fiberboard of improved moisture resistance and its process of manufacturer.

BACKGROUND

1. Field of the Invention

The conventional composite fiberboards, typical of those used for acoustical ceilings, are composed of mineral wool, perlite and newsprint, which is primarily cellulosic fibers, as the primary ingredients. These materials are formed into boards from aqueous slurries using an organic binder such as starch.

The mineral wool may be composed of fibers of rock wool or basalt wool. It is also possible to use glass fibers, alone, or mixed with the mineral wool. The fibers, in general, have a diameter of 3 to 6 microns. The fibers may be used in the "sized" or "naked" state. Sizing agents such as mineral oils or acrylic polymer dispersions may be employed. These fibers contribute to the structural integrity and strength of the board.

The perlite is a volcanic glass ore composed of aluminum, calcium or other alkaline earth silicate. Prior to use in the fiberboard process, the perlite ore is expanded at high temperatures to obtain densities of 2 to 10 pounds/cubic foot (pcf), preferably 3 to 7 pcf. Perlite contributes to the bulk and hardness of the board.

The third important ingredient is the so-called "newsprint". Specifically, the newsprint is composed of cellulosic fibers. These fibers contribute to the wet strength of the board as it is converted from the slurry to the substantially solid cake enroute to becoming the board. Hereinafter, these fibers will be referred to as "cellulosic newsprint" fibers.

The mixture may also contain fillers, flame-proofing agents, pigments, water repellants, etc. The fillers employed are usually finely divided clays, e.g. kaolin, ball clay, etc.

In the process of preparing the board, the ingredients are mixed together with the amount of water necessary to provide slurry consistency in conventional mixing and holding equipment. Additional water and "dry broke" may be added to the slurry prior to the addition of the starch binder. The starch is employed in amounts as high as about 15%, based on the three primary ingredients. The "dry broke" is predominantly recycled board material that may have been rejected or cut from the commercially acceptable boards, as well as other waste products.

The slurry is then flowed onto the board forming wire of a Fourdrinier through a conventional head box. Suction may be applied as well as pressure, if desired, to assist in drainage and compaction using conventional means.

The disadvantage of these conventional sound-insulating boards is their moisture sensitivity. Their tendency to sag in a moist atmosphere may make it necessary to coat or impregnate the back and/or face of the boards with, for example, thermosetting plastics or other moisture-resistant compositions. Not only does this add the extra coating step, but further drying and heating becomes necessary. In short, a very expensive board results.

2. Description of the Prior Art

In U.S. Pat. No. 4,587,278, sound-insulating boards which are based on mineral fibers and thermoplastic binders are disclosed to overcome the moisture-sensitive disadvantages of the starch-bound board. The binders disclosed in this patent are polymers having glass transition temperatures from 38° to 80° C. These binders may be inadequate for the boards to retain dimensional stability without any substantial sag when exposed for prolonged periods at high temperatures with high humidity.

In European Laid-Open Patent Application 0 266 850 published May 11, 1988, as in U.S. application Ser. No. 928,237 filed Nov. 7, 1986, the applicant discloses the use of thermoplastic binders (latex compositions) having glass transition temperatures anywhere from 35° C. to 115° C. The boards disclosed contain newsprint, perlite, mineral wool and clay as well as the latex binder. They are manufactured by incorporating the latex binder into a previously prepared aqueous slurry of the other ingredients. The resulting boards, according to the disclosure, display acceptable strength as determined by measuring the modulus of rupture (MOR) in accordance with ASTM 367-78. The modulii of rupture, as disclosed in the published application, vary from about 140 to slightly above 180 psi. The applicant also discloses an improvement in "dimensional stability" as measured by the composite board's sag resistance. Specifically, by exposing a 1.5×6 inch (40 mm×150 mm) strip of board to 94° F. (35° C.), and 90% relative humidity for 96 hours while retaining a 330 gram weight at its center, the applicant asserts that he obtained a displacement of the center of the board of 1.0 mm or less.

In U.S. Ser. No. 275,914 filed Nov. 25, 1988, we first disclosed a process for minimizing the amount of thermoplastic polymeric latex binder required to provide a commercially attractive composite board containing cellulosic newsprint along with mineral wool and perlite. The board displayed acceptable strength as reflected in a more than adequate MOR and an unexpectedly high dimensional stability as reflected in a minimum sag upon exposure to the severe conditions of humidity and temperature used in the sag test. In subsequent applications (U.S. Ser. No. 356,217 filed May 24, 1989, and U.S. Ser. No. 434,041 filed Nov. 15, 1989), we provided the results of additional tests in which we further reduced the amount of expensive latex binder required to provide a strong, dimensionally stable, cellulose-containing composite board. In all three of our prior patent applications, the crux of the invented process was in selectively depositing the latex binder onto the cellulosic fibers prior to binding all of the board's components to form the ultimate board.

SUMMARY OF THE INVENTION

The object of this invention is still to provide composite boards of mineral wool, perlite and 4–35% by weight of cellulosic newsprint fibers that display substantially no sag (less than 0.2 inches or 200 mils) when a 9×24 inch board, 0.6 inch thick, is supported at each end to form a 23 inch span and exposed to a temperature of 85° F., and a relative humidity of 95% for 24 hours.

The object is still broadly accomplished by using 4-15% by weight of a latex composition having a glass transition temperature (Tg) of at least 80° C. in a manner such that the newsprint fibers are coated with the latex substantially completely prior to final binding of the composite mixture by the latex. For a commercially viable process, it is still important that the ratio of the latex binder-to-newsprint be no greater than about 1-1.25, preferably no greater than 0.7 and most preferably, no greater than 0.4.

The ratio of the latex binder-to-newsprint being no greater than 0.7, preferably no greater than 0.4, applies to composite boards prepared from compositions containing at least 6% by weight of cellulose. Although these maximum ratios of latex binder-to-newsprint, i.e. 0.7, preferably 0.4, are applicable to cellulose contents below 6% by weight for the purpose of reducing sag in the ultimate composite board, it is advisable to use an additional amount of latex binder, i.e. up to a ratio of latex binder to newsprint of about 1-1.25, to provide the desired strength for the board. In other words, although the lower ratios, i.e. 0.7 and 0.4, are adequate for coating up to 6% newsprint fibers substantially completely with the latex, the use of the higher maximum ratios, i.e. 1-1.25, involving additional latex, is important for final binding of the composite mixture by the latex at these lower proportions of newsprint fibers, i.e. less than 6%, in the composite mixture.

The object of the present invention is to further reduce the amount of latex used in the aforementioned cellulose-containing composite board without any substantial diminution of the board's properties, i.e., without any loss of strength or loss of dimensional stability.

The objects are accomplished by incorporating into the latex composition up to 85%, i.e., about 5-85%, preferably 25-75%, by weight of extender particles, the largest dimension (equivalent diameter) of the particles 0.1-0.4 micron, the extender being an inert inorganic oxide or carbonate.

As extenders, particles of the following compounds will be useful in this invention: silicon dioxide, titanium dioxide, iron oxide, calcium oxide, calcium carbonate, aluminum oxide, magnesium oxide, magnesium carbonate, and certain clays consisting of layers of silicon dioxide and aluminum oxide.

Most of these compounds are characterized by three important features:

1. Although not absolutely essential, the clays are obtainable with high aspect ratios (long axis-to-short axis), i.e., as a plate-like particle rather than a spherical particle; and as a plate-like particle, these minerals cover greater areas of the cellulose fiber surfaces, particularly when their long axes are parallel to the fiber;

2. They are inexpensive. For example, Engelhard's ASP-170 is a silicon dioxide/aluminum oxide material costing $0.20/pound compared to about $1.00/pound for the latex.

3. The oxides are water-resistant, particularly the oxides of silicon and titanium and some of the clays.

Specifically, the latex-extender composition is first prepared by mixing the latex, the extender particles and a solution of a cationic coagulant such as DADMAC. Thereafter, the selective deposition of the latex-extender composition onto the cellulose fibers of the newsprint may be accomplished by any of the following three processes:

1. The most general method is to introduce a coagulant prior to or along with the latex-extender composition in the conventional ceiling board process. The coagulant is added to the whole or part of the board components of 0-87%, preferably 0-75% mineral wool fibers, 5-65% perlite, 0-25% clay, and 4-35% cellulosic newsprint, followed by the addition of as little as 2%, preferably 4-15% of the latex-extender composition. The latex-extender composition may be added in one or more steps. To obtain the best results, it is important that sufficient coagulant is used to deposit an amount of the latex-extender composition to coat the available cellulose fibers of the newsprint substantially before the mixture is formed into a suitable wet form. Thereafter, the form is heated to enable the remaining amount of latex to bind the components of the mixture in the form of the board.

2. An alternative is to selectively deposit a cationic latex with extender particles onto the cellulosic newsprint fibers. The fiber, being anionic, will retain the cationic latex material and the extender particles on its surface. This alternative eliminates the need for the coagulant. This method may be used alone or in conjunction with the use of an anionic latex plus extender and coagulant, as set forth in the methods 1 and 2.

BRIEF DESCRIPTION OF THE DRAWINGS AND THE BEST MODE

The invention will be more clearly understood by referring to the drawings and the description of the best mode for carrying out the invention that follows.

Figure 1:
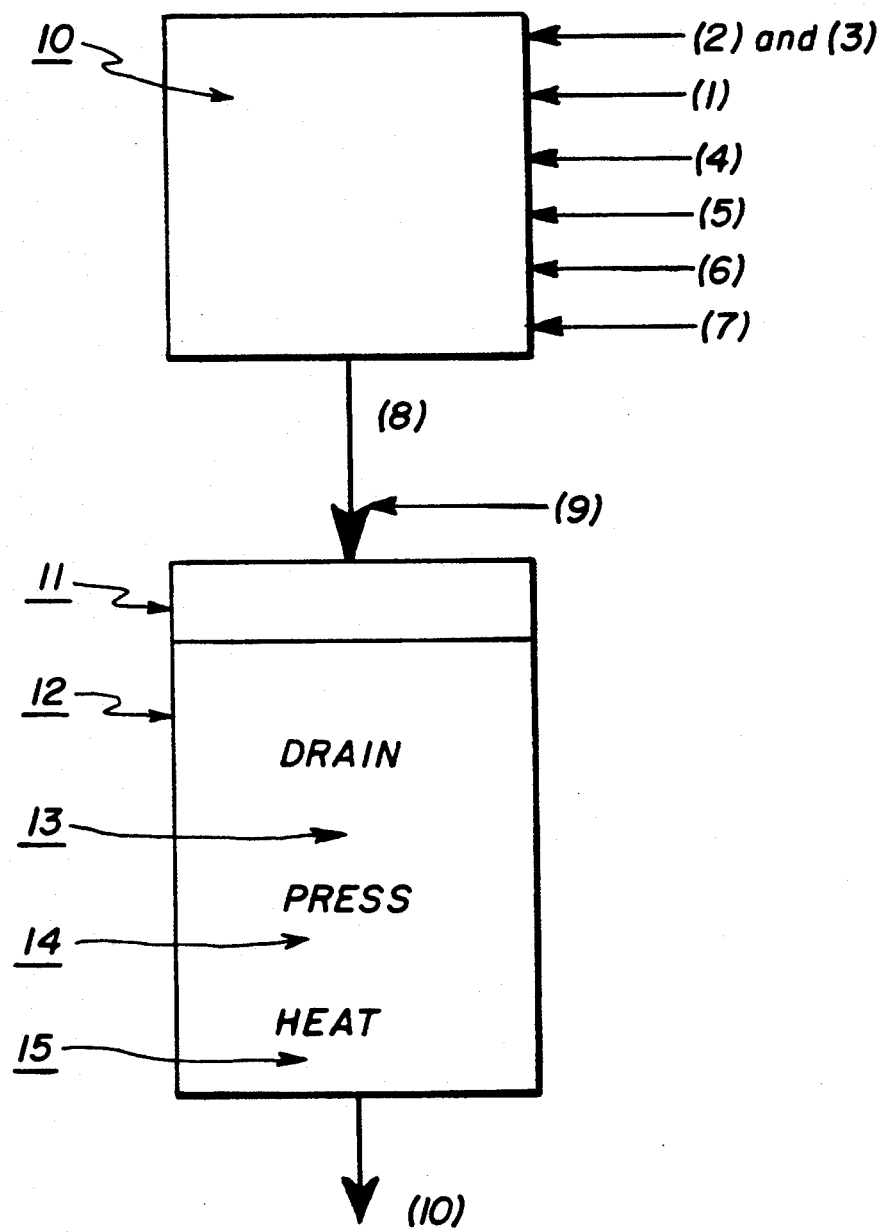
FIG. 1 represents a flow sheet of the preferred method for carrying out the process of the invention.

In the most preferred situation as shown in FIG. 1, the coagulant (2), a poly (diallyldimethylammonium) chloride [DADMAC] having an average molecular weight of about 200,000 and a charge density of 6.2 milliequivalents/gram, is added to a portion of the total latex-extender composition (3). Specifically, an anionic latex emulsion prepared from styrene, methyl methacrylate, and ethyl acrylate, as described, in general, in European Patent application 0,266,850, may be used as the latex. The Tg of the copolymer is about 100° C. Anywhere from 10% to 100%, preferably 10% to 50%, of the total latex-extender composition to be added, is added at this step. To this combination is added a previously prepared aqueous dispersion of the cellulosic newsprint fibers (1) under agitation in the mixer 10. The fiber dispersion is composed of 2-7% by weight of the fibers.

It should be understood that the amounts of coagulant, latex and extender used in this step will depend upon the amount of cellulose fibers present. The amounts are interrelated and may be engineered to optimize the coating effect of the latex-extender composition on the cellulosic fibers. Preferably, the remaining portion of the latex-extender composition is added with agitation at this point.

In the next step, the mineral wool (4), is added and the mixture is further agitated. Thereafter, additional coagulant and pure latex (5) may be added either prior or subsequent to the addition of the perlite (6) and the "dry broke" (7) while agitation continues in the mixing tank. If coarse clay is used in the composition, it is added as a dispersion with agitation in the final step.

The resultant slurry (8) is pumped onto the board-forming wire of a Fourdrinier through a conventional head box 11. A flocculant (9), a polyacrylamide of extremely high molecular weight, e.g. 2,000,000–10,000,000 and having a charge density of 0.1–3 milliequivalents/gram is added to the slurry just prior to its entry into the head box 11. The ingredients used in forming the slurry, based on percent by weight of solids, include about 4–25% cellulosic newsprint fibers, to about 75% mineral wool, 5–65% perlite, and 4–15% of the latex-extender composition. About 2–8% coagulant (based on the weight of the selectively deposited latex-extender composition) is used.

The flocculated product is permitted to drain at 13 on the moving wire belt 12 of the Fourdrinier. This is followed by the application of pressure at 14 and heat at 15 to dry the material in the form of a board (10).

The composite board, after the wet-forming process and subsequent drying, is sanded to a specific gauge. The face of the composite board can be punched with acoustical pins to improve the board's acoustical properties. The face of the composite board can be decorated using various methods: fissuring, routing, embossing, etching, painting (face and/or back), or any combination thereof, to produce the finished product. Some of these products are shown in Sweet's General Building Files, Catalog Code 09500/ARO.

It should be understood that these processes can be used to make other products, e.g. gasketing, floor backing, etc., some of which would not include the mineral wool or perlite or clay. However, all products would involve the selective deposition of the latex-extender composition on cellulosic fibers as described herein. It should also be understood that other conventional processes (other than the use of a Fourdrinier) may be used to prepare these products. Thus, wet forming on a cylinder machine or a cast molded process could also produce the products.

An anionic dispersion of a copolymer of styrene, methyl methacrylate and ethyl acrylate has been shown in the latex-extender composition of the preferred embodiment. However, it should be understood that any copolymer, usually having a substantial amount of styrene, but having a Tg of 80° C.–115° C. or higher may be used, preferably a Tg of 100° C. or higher. The latex composition will typically include from 50 to 100 weight percent of a hard monomer, e.g. styrene, methyl methacrylate (whose homopolymer has a Tg of at least 80° C.) and up to 50 weight percent of a soft monomer, e.g. butadiene, ethyl acrylate, butyl acrylate (whose homopolymer has a Tg of less than 35° C.). Preferably, the hard monomer is present in an amount from 65 to 95 weight percent and the soft monomer is present in an amount from 5 to 35 weight percent. An alpha-beta 3-ethylenically unsaturated carboxylic acid such as acrylic, methacrylic, fumaric, itaconic, aconitic, and various alpha, beta-substituted acrylic acids, may also be incorporated in the copolymer to the extent of up to 10 weight percent, based on the weight of the final polymer.

The preferred latex particle diameter is less than or equal to 0.120 micron as measured using Brookhaven Model BI-90 particle size analyzer. To prepare the latex for particle size measurement, 2-3 drops of latex is added to a 0.001M KCl solution to make a 200–300 ppm latex sample which is then sonicated.

Coagulants useful in the invention may be organic, low molecular weight polymers which reverse the charge on the latex particles without aggregation. The mechanism involves adsorption onto the latex particle. The preferred coagulants for use in this invention are organic polymeric coagulants of low molecular weight (from about 10,000 up to about 1,000,000) and high charge (correspondingly, from about 8 down to about 3 milliequivalents/gram) which adsorb on the particle surfaces. Such coagulants are well known to those skilled in the art and include, inter alia, polyethyleneimines, polyamines, substituted polyamines, etc. The most preferred is poly(diallyldimethylammonium) chloride [DADMAC] whose molecular weight is between 10,000 and 1,000,000 and whose charge density is 6.2 milliequivalents/gram.

The flocculants useful in the invention are also polymeric. However, they are usually of much higher molecular weight than the coagulants and of lower charge density. Thus, molecular weights for the flocculants may vary from 2,000,000 to 10,000,000 and their charge densities, from 0.1 to 3 milliequivalents per gram. The flocculants may be cationic, anionic, or non-ionic. The flocculants that are useful in this field include polyacrylamides, copolymers of acrylamide with substituted acrylates, polyetnyleneimides, etc. The preferred flocculant is a cationic polyacrylamide.

Figure 2:
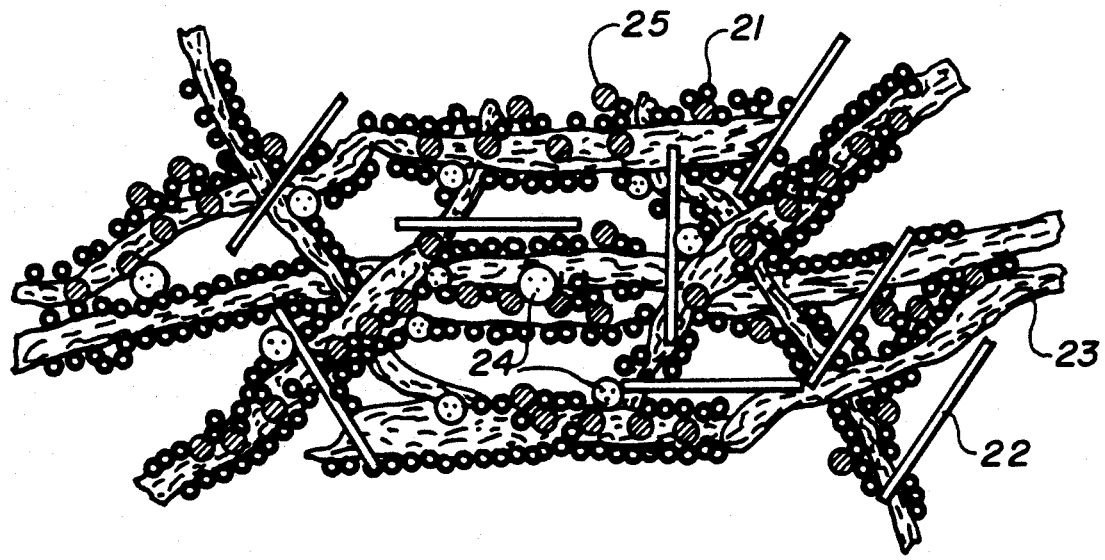
FIG. 2 is a sketch of the cross-section of the fiberboard product of the invention produced by selective deposition of the latex-extender composition.

A cross-section of the product is shown in FIG. 2. The product is composed of latex binder particles 21, mineral wool fibers 22, cellulosic newsprint fibers 23, the perlite spherulites 24, and the extender particles 25. It will be noted that the latex particles 21 and the extender particles 25 are distributed over the surface of the cellulosic newsprint fibers 23. As discussed previously, this is accomplished by the strategic use of coagulant when using an anionic latex and extender composition or by selective deposition using a cationic latex and extender composition.

The invention will be more easily understood by referring to the examples of the invention and the control examples that follow. In these examples, all the percentages are by weight unless otherwise specified.

The "sag" in mils, was measured on a 0.6 inch thick board (nominal ⅝ inch board) that was 9 inches wide and 24 inches long. While being supported at both ends to form a 23 inch span, the board was exposed to a temperature of 85° F. and a relative humidity of 95%. After 24 hours of exposure, the displacement of the center of the 24 inch long board is measured in mils.

The modulus of rupture (MOR) of the board is measured by the procedure given in ASTM D-1037. MOR is calculated as being equal to $3PL/2bd^2$ psi where:

P = peak force required to break the sample (lbs.)
L = span between the sample supports (inches)
b = width of the sample (inches)
d = thickness of the sample (inches)

MOR may be corrected for density variations by multiplying by $D^2$ where D = desired density/actual density.

The density of the board products set forth in the following examples are expressed in pounds per board foot (pbf), and is determined by weighing a sample board having dimensions of one foot square and a thickness of one inch. The density calculation for thinner or thicker boards is computed by dividing the weight of a one foot square board sample by the thickness of the board sample expressed in inches.

CONTROL EXAMPLE 1

17 grams of B. F. Goodrich latex* was made cationic by mixing with a 1.08% solution of DADMAC coagulant that contained 1.19 grams of DADMAC coagulant. 55.4 grams of pulped cellulose fibers (newsprint) was added to 3.7 liters of water, and to this was added the cationic latex. The resultant slurry was mixed in a mini-pulper for 1 minute. An additional 17 grams of latex was added and mixed for 1 minute.

* A B. F. Goodrich styrene/acrylate latex (entitled "Experimental Latex", #913-254-102, having an average particle size of about 0.110 micron and a Tg of 103° C.

369.8 grams of mineral wool was added to 26.4 liters of water in a mix tank and mixed for 1 minute. To this was added the latex/newsprint slurry and mixed 8 minutes. 192.6 grams of perlite and 348 grams of pulped dry broke was added and mixed for 1 minute. 170.4 grams of clay and 29.8 grams of latex was then added and mixed for 1 minute. 0.45 grams of a high charge polyacrylamide, high molecular weight flocculant was added under moderate agitation.

The flocculated furnish was poured into a mold apparatus at 1.6% solids. The furnish was drained on a retaining wire surface. The resulting wet mat was pressed to a thickness of 0.650" and dried at a temperature of 350° to 370° F. in a forced air oven. The resulting board was 14" wide and 26" long, had a thickness of 0.700" and a density of 1.35 pbf. Its composition was as follows:

| Wool fibers | 30.80% |
| --- | --- |
| Cellulose | 4.62% |
| Perlite | 16.05% |
| Clay | 14.20% |
| Latex, 1st | 1.42% |
| Latex, 2nd | 1.42% |
| Latex, 3rd | 2.49% |
| Dry Broke | 29.00% |
| Ratio of latex: | cellulose = 1.15 |

The MOR of the face-sanded board (0.590" thickness) was 174 psi and its "sag" measured—112 mils.

EXAMPLE 2

10.2 grams of B. F. Goodrich latex and 6.8 grams of Engelhard ASP-170* was made cationic by mixing with a 1.42% solution of DADMAC coagulant that contained 2.0 grams of DADMAC coagulant. 55.4 grams of pulped cellulose fibers (newsprint) was added to 3.7 liters of water, and to this was added the cationic latex/extender composition. The resultant slurry was mixed in a mini-pulper for 1 minute. An additional 10.2 grams of latex and 6.8 grams of ASP-170 was added to 140.6 grams of water. The resultant slurry was added to the mini-pulper and mixed for 1 minute.

*Engelhard ASP-170 are extender particles composed of silicon dioxide and aluminum oxide plates having an equivalent particle diameter of 0.4 micron and manufactured by Engelhard Corporation.

369.8 grams of mineral wool was added to 26.4 liters of water in a mix tank and mixed for 1 minute. To this was added the latex/extender/newsprint slurry and mixed 8 minutes. 192.6 grams of perlite and 348 grams of pulped dry broke was added and mixed for 1 minute. 170.4 grams of clay and 29.8 grams of latex was then added and mixed for 1 minute. 0.45 grams of a high charge polyacrylamide, high molecular weight flocculant was added under moderate agitation.

The flocculated furnish was poured into a mold apparatus at 1.6% solids. The furnish was drained on a retaining wire surface. The resulting wet mat was pressed to a thickness of 0.650" and dried at a temperature of 350° to 370° F. in a forced air oven. The resulting board was 14" wide and 26" long, had a thickness of 0.700" and a density of 1.35 pbf. Its composition was as follows:

| Wool | 30.80% |
| --- | --- |
| Cellulose | 4.62% |
| Perlite | 16.05% |
| Clay | 14.20% |
| Latex, 1st | 0.85% |
| Latex, 2nd | 0.85% |
| Latex, 3rd | 2.49% |
| ASP-170, 1st | 0.57% |
| ASP-170, 2nd | 0.57% |
| Dry Broke | 29.00% |
| Ratio of latex: | cellulose = 0.91 |
| Ratio of latex: | extender = 60:40 |

The MOR of the face-sanded board (0.590" thickness) was 170 psi and its "sag" measured—96 mils.

EXAMPLE 3

4.3 grams of Engelhard ASP-170* was made cationic by mixing with a 0.90% solution of DADMAC coagulant that contained 1.33 grams of DADMAC coagulant. 55.4 grams of pulped cellulose fibers (newsprint) was added to 3.7 liters of water, and to this was added the cationic latex/extender composition. The resultant slurry was mixed in a mini-pulper for 1 minute. An additional 4.3 grams of latex and 12.8 grams of ASP-170 was added to 148.0 grams of water. The resultant slurry was added to the minipulper and mixed for 1 minute.

*Engelhard ASP-170 are extender particles composed of silicon dioxide and aluminum oxide plates having an equivalent particle diameter of 0.4 micron and manufactured by Engelhard Corporation.

369.8 grams of mineral wool was added to 26.4 liters of water in a mix tank and mixed for 1 minute. To this was added the latex/extender/newsprint slurry and mixed 8 minutes. 192.6 grams of perlite and 348 grams of pulped dry broke was added and mixed for 1 minute. 170.4 grams of clay and 29.8 grams of latex was then added and mixed for 1 minute. 0.45 grams of a high charge polyacrylamide, high molecular weight flocculant was added under moderate agitation.

The flocculated furnish was poured into a mold apparatus at 1.6% solids. The furnish was drained on a retaining wire surface. The resulting wet mat was pressed to a thickness of 0.650" and dried at a temperature of 350° to 370° F. in a forced air oven. The resulting board was 14" wide and 26" long, had a thickness of 0.700" and a density of 1.35 pbf. Its composition was as follows:

| Wool | 30.80% |
| --- | --- |
| Cellulose | 4.62% |
| Perlite | 16.05% |
| Clay | 14.20% |
| Latex, 1st | 0.36% |
| Latex, 2nd | 0.36% |
| Latex, 3rd | 2.49% |
| ASP-170, 1st | 1.06% |
| ASP-170, 2nd | 1.06% |
| Dry Broke | 29.00% |

-continued

| Ratio of latex: | cellulose = 0.69 |
|---|---|
| Ratio of latex: | extender = 25:75 |

The MOR of the face-sanded board (0.590" thickness) was 164 psi and its "sag" measured—72 mils.

EXAMPLE 4

10.2 grams of B. F. Goodrich latex and 6.8 grams of Elkem EMS-960* was made cationic by mixing with a 1.42% solution of DADMAC coagulant that contained 2.0 grams of DADMAC coagulant. 55.4 grams of pulped cellulose fibers (newsprint) was added to 3.7 liters of water, and to this was added the cationic latex-/extender composition. The resultant slurry was mixed in a mini-pulper for 1 minute. An additional 10.2 grams of latex and 6.8 grams of EMS-960 was added to 140.6 grams of water. The resultant slurry was added to the minipulper and mixed for 1 minute. * Elkem EMS-960 are silicon dioxide particles that are substantially spherical having a diameter of 0.7 micron.

369.8 grams of mineral wool was added to 26.4 liters of water in a mix tank and mixed for 1 minute. To this was added the latex/extender/newsprint slurry and mixed 8 minutes. 192.6 grams of perlite and 348 grams of pulped dry broke was added and mixed for 1 minute. 170.4 grams of clay and 29.8 grams of latex was then added and mixed for 1 minute. 0.45 grams of a high charge polyacrylamide, high molecular weight flocculant was added under moderate agitation.

The flocculated furnish was poured into a mold apparatus at 1.6% solids. The furnish was drained on a retaining wire surface. The resulting wet mat was pressed to a thickness of 0.650" and dried at a temperature of 350° t 370° F. in a forced air oven. The resulting board was 14" wide and 26" long, had a thickness of 0.700" and a density of 1.35 pbf. Its composition was as follows:

| Wool | 30.80% |
|---|---|
| Cellulose | 4.62% |
| Perlite | 16.05% |
| Clay | 14.20% |
| Latex, 1st | 0.85% |
| Latex, 2nd | 0.85% |
| Latex, 3rd | 2.49% |
| EMS-960, 1st | 0.57% |
| EMS-960, 2nd | 0.57% |
| Dry Broke | 29.00% |
| Ratio of latex: | cellulose = 0.91 |
| Ratio of latex: | extender = 60:40 |

The MOR of the face-sanded board (0.590" thickness) was 148 psi and its "sag" measured—88 mils.

CONTROL EXAMPLE 5

4.3 grams of B. F. Goodrich latex was made cationic by mixing with a 1.08% solution of DADMAC coagulant that contained 0.31 grams of DADMAC coagulant. 55.4 grams of pulped cellulose fibers (newsprint) was added to 3.7 liters of water, and to this was added the cationic latex composition. The resultant slurry was mixed in a mini-pulper for 1 minute. An additional 4.3 grams of latex was added to the mini-pulper and mixed for 1 minute.

395.3 grams of mineral wool was added to 26.4 liters of water in a mix tank and mixed for 1 minute. To this was added the latex/newsprint slurry and mixed 8 minutes. 192.6 grams of perlite and 348 grams of pulped dry broke was added and mixed for 1 minute. 170.4 grams of clay and 29.8 grams of latex was then added and mixed for 1 minute. 0.45 grams of a high charge polyacrylamide, high molecular weight flocculant was added under moderate agitation.

The flocculated furnish was poured into a mold apparatus at 1.6% solids. The furnish was drained on a retaining wire surface. The resulting wet mat was pressed to a thickness of 0.650" and dried at a temperature of 350° to 370° F. in a forced air oven. The resulting board was 14" wide and 26" long, had a thickness of 0.700" and a density of 1.35 pbf. Its composition was as follows:

| Wool | 32.92% |
|---|---|
| Cellulose | 4.62% |
| Perlite | 16.05% |
| Clay | 14.20% |
| Latex, 1st | 0.36% |
| Latex, 2nd | 0.36% |
| Latex, 3rd | 2.49% |
| Dry Broke | 29.00% |
| Ratio of latex: | cellulose = 0.69 |

The MOR of the face-sanded board (0.590" mils.

Examples 1 and 5 are control examples for comparison to Examples 2 through 4. Example 1 uses 5.33% latex; Examples 2 through 4 are filled versions of the formula used in Example 1, thereby reducing the amount of latex without significantly affecting the board's physical properties. Example 5 uses the same percentage of latex as in Example 3. The comparison of Examples 3 and 5 emphasizes the reinforcing characteristic of the extender particles.

What is claimed is:

1. In a composite board which comprises up to 87% by weight mineral wool, 5–65% by weight perlite, up to 25% by weight clay, 4–35% by weight cellulosic newsprint composed primarily of cellulosic fibers, and 2–15% by weight of a binder composition comprising at least one thermoplastic polymer having a glass transition temperature of from 80° C. to 115° C., the ratio of said binder to said cellulosic newsprint being no greater than about 1.25 when said cellulosic newsprint content is less than 6% by weight and said ratio being no greater than 0.7 when said cellulosic newsprint content is at least 6% by weight, wherein the cellulose fibers in said board are substantially completely coated with said binder composition, said board displaying a sag of less than 200 mils when a 0.6 inch thick sample, 9 inches wide and 24 inches long is supported at both ends and exposed to a temperature of 85° F. and a relative humidity of 95% for 24 hours, the improvement wherein said binder composition consists essentially of said thermoplastic polymer and 5–85% by weight of extender particles having their largest dimension of up to about 0.6 micron and being selected from the group consisting of inorganic oxides and inorganic carbonates.

2. The composite board of claim 1 wherein said binder composition consists essentially of 25–70% of said extender particles.

3. The composite board of claim 1 wherein the largest dimension of said extender particles is from 0.1 to 0.4 micron.

4. The composite board of claim 1 wherein said extender particles are selected from the group consisting of silicon dioxide, titanium dioxide, iron oxide, calcium oxide, calcium carbonate, aluminum oxide, magnesium oxide and magnesium carbonate or combinations thereof.

5. The composite board of claim 1 wherein said extender particles are selected from the group consisting of silicon dioxide, titanium dioxide and aluminum oxide.

6. The composite board of claim 1 wherein said thermoplastic polymer is a copolymer of styrene and an acrylate, said binder composition consists essentially of 25-70% extender particles having their largest dimension from 0.1-0.4 micron and are selected from the group consisting of aluminum oxide and silicon dioxide.

7. In the process for making a product containing at least the components of 4-35% by weight cellulosic newsprint composed primarily of cellulose fibers, and 2-15% by weight of a binder composition containing a thermoplastic polymer wherein the components are mixed with water to form an aqueous slurry, and said slurry is flocculated while being fed to a mold and shaped, the shaped material drained of liquid and pressed into the shape and thickness of said product and then heated to solidify said product, and wherein said binder composition is coated on the cellulose fibers of the newsprint substantially completely before the slurry is fed to the mold, the improvement wherein said binder composition consists essentially of said thermoplastic polymer and 5-85% by weight of extender particles having their largest dimension of up to about 0.6 micron and being selected from group consisting of inorganic oxides and inorganic carbonates.

* * * * *

UNITED STATES PATENT AND TRADEMARK OFFICE
CERTIFICATE OF CORRECTION

PATENT NO. : 5,134,179
DATED : July 28, 1992
INVENTOR(S) : John Felegi, Jr. et al.

It is certified that error appears in the above-identified patent and that said Letters Patent is hereby corrected as shown below:

Column 3, line 42, before "0.1-0.4 micron", add --being up to about 0.6 micron, preferably in the range of--.

Column 8, line 28, after "of" and before "Engelhard", add --B. F. Goodrich latex and 12.8 grams of--.

Column 10, line 24, after "(0.590"" and before "mils", add --thickness) was 135 psi and its "sag" measured - 101--.

Signed and Sealed this

Fifth Day of October, 1993

Attest:

BRUCE LEHMAN

*Attesting Officer*  *Commissioner of Patents and Trademarks*